United States Patent
Erler

(10) Patent No.: US 10,895,652 B2
(45) Date of Patent: Jan. 19, 2021

(54) OBJECT RADIOGRAPHY APPARATUS AND METHOD FOR DETERMINING A STATE OF AN OBJECT RADIOGRAPHY APPARATUS

(71) Applicant: Carl Zeiss Industrielle Messtechnik GmbH, Oberkochen (DE)

(72) Inventor: Marco Erler, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 30 days.

(21) Appl. No.: 16/258,346

(22) Filed: Jan. 25, 2019

(65) Prior Publication Data

US 2019/0235101 A1 Aug. 1, 2019

(30) Foreign Application Priority Data

Jan. 26, 2018 (DE) .......................... 10 2018 201 247

(51) Int. Cl.
*G01N 23/00* (2006.01)
*G01T 7/00* (2006.01)
*G01T 1/20* (2006.01)
*G01T 1/185* (2006.01)

(52) U.S. Cl.
CPC ............. *G01T 7/005* (2013.01); *G01N 23/00* (2013.01); *G01T 1/185* (2013.01); *G01T 1/20* (2013.01)

(58) Field of Classification Search
CPC ............................... G01N 23/00; G01N 23/046
See application file for complete search history.

(56) References Cited

U.S. PATENT DOCUMENTS

| 6,333,964 B1 | 12/2001 | Hobel |
| 6,505,966 B1 | 1/2003 | Guru |
| 9,543,109 B2 | 1/2017 | Yun et al. |
| 2005/0100133 A1* | 5/2005 | Reinhold ................. H05G 1/34 378/138 |
| 2010/0316183 A1* | 12/2010 | Fuchs .................. G01N 23/046 378/6 |

(Continued)

FOREIGN PATENT DOCUMENTS

| DE | 10352334 A1 | 6/2005 |
| DE | 102006033716 A1 | 2/2008 |

(Continued)

*Primary Examiner* — Dani Fox
(74) *Attorney, Agent, or Firm* — Falk Ewers; Ewers IP Law PLLC

(57) ABSTRACT

An object radiography apparatus includes a radiation source configured to generate and emit an electromagnetic radiation for radiographing an object, a detector device, which is arranged in such a way that the emitted electromagnetic radiation which passes at least partly through the object impinges at least proportionally on the detector device, and which is configured to generate a radiograph of the object. In addition to the detector device, a sensor arrangement is provided, which is configured to determine a radiation characteristic variable assigned to the radiation source. An evaluation unit is configured to determine or to receive a quality parameter of the detected radiograph, to evaluate the radiation characteristic variable and to make a statement about a state of the detector device and/or of the radiation source on the basis of the quality parameter and the radiation characteristic variable.

15 Claims, 4 Drawing Sheets

(56) References Cited

U.S. PATENT DOCUMENTS

2014/0086390 A1* 3/2014 Nakatsugawa ........ A61B 6/542
378/62
2017/0184737 A1 6/2017 Dujmic
2017/0319161 A1 11/2017 Bothorel et al.

FOREIGN PATENT DOCUMENTS

| DE | 102008011391 A1 | 10/2009 |
| DE | 102012210638 A1 | 12/2013 |
| KR | 1020170082525 A | 7/2017 |
| WO | 9858244 A1 | 12/1998 |
| WO | 2014140099 A2 | 9/2014 |

* cited by examiner

OBJECT RADIOGRAPHY APPARATUS AND METHOD FOR DETERMINING A STATE OF AN OBJECT RADIOGRAPHY APPARATUS

CROSS REFERENCE TO RELATED APPLICATIONS

This application claims priority to German patent application DE 10 2018 201 247.4, filed on Jan. 26, 2018, the entire content of which is incorporated herein by reference.

TECHNICAL FIELD

The invention relates to an object radiography apparatus and to a method for radiographing an object. In particular, the invention relates to a solution for ascertaining a functionality of a detector used for detecting object radiographs, and/or of a radiation source for generating the radiation.

BACKGROUND

Radiography apparatuses and methods are used for examining objects and, in particular, for checking workpieces manufactured-industrially or by skilled workers. It is thereby possible for example to check and/or ascertain the dimensional accuracy of a workpiece or the presence of internal defects. In particular, for this purpose use is made of solutions from the field of Computed Tomography (CT), which are based on invasive electromagnetic radiation in particular in the form of X-ray radiation. X-ray radiation can be generated by accelerating (decelerating) particles (e.g., electrons) in a target of an X-ray radiation source. In this context, the spectral range of the invasive radiation is not limited by specific wavelengths.

In CT apparatuses and methods, a workpiece is irradiated with X-ray radiation from different directions of incidence in order to capture a plurality of radiographs, or in particular X-ray images. These thus represent projection images. The latter are subsequently combined by a computer to form a three-dimensional (3D) representation of the radiographed workpiece.

Detectors including for example a scintillator and/or photodiodes are used to generate the results of the radiography, i.e., the radiographs. In particular, the detectors can be configured as so-called flat image detectors, i.e., detectors having a small depth. The detectors are configured in particular to generate a two-dimensional radiograph from the electromagnetic radiation which at least partly penetrates through the object or workpiece and is then incident on the detector. For this purpose, the detectors can include a plurality of individual detector elements for each generating a respective pixel, which are often configured in a matrix form with detector elements arranged in rows and columns and in each case detect a radiation value specific to the element, i.e., a value of the quantity of radiation impinging on the element in the detection time interval. In particular, a gradual radiation value can be detected pixel by pixel, which value can be represented in a corresponding image as a so-called greyscale value of the pixel.

It has been found that the quality of the images detected by a detector apparatus can decrease over time on account of ageing effects. In particular, over time the detector apparatus may carry out erroneous or imprecise image detections. Meaningful workpiece checking can be made more difficult or even impossible as a result. However, since the detector apparatus is a comparatively expensive component, unnecessarily early exchange should be avoided, on the other hand.

The quality of the radiation source of invasive radiation can also decrease over the course of time. In particular, the target can wear and a transmittance of a window through which the invasive radiation leaves the source and is radiated onto the measurement object can decrease. In the case of target wear, the radiation flux density of the radiation that is radiated onto the target within the source can decrease over the course of time.

The source and the components thereof are also parts which should not be exchanged too early having regard to economic aspects.

There is thus a need to reliably detect degradations of the detector apparatus and of the radiation source.

SUMMARY

The invention generally relates to the approach of not only detecting possible fault variables of the detector apparatus, but also detecting additional variables in order to rule out other fault sources for a deficit image quality. By way of example, according to one aspect of the invention, a radiation dose of the electromagnetic radiation is additionally determined in order to rule out a decrease in the image quality on account of a defective radiation source and not on account of a defective detector apparatus, or in order to ascertain to what extent the power of the radiation source has decreased. Consequently, it is possible to determine with a higher reliability whether and/or to what degree the detector apparatus and/or the radiation source are/is actually defective and/or must be exchanged.

Accordingly, an object radiography apparatus and a method are provided as disclosed herein.

The object radiography apparatus includes a radiation source configured to generate and to emit an electromagnetic radiation for radiographing an object. Furthermore, the object radiography apparatus includes a detector device, which is arranged in such a way that the emitted electromagnetic radiation which passes at least partly through the object impinges at least proportionally on the detector device, and which is configured to generate a radiograph of the object (also called projection image). A sensor arrangement of the object radiography apparatus, the sensor arrangement being present in addition to the detector device, is furthermore configured to determine a radiation characteristic variable assigned to the radiation source, in particular a radiation dose (e.g., in a solid angle range detected by the sensor arrangement) and/or an instantaneous radiation power, in particular a radiation flux density. An evaluation unit is configured to determine or to receive a quality parameter of the detected radiograph and to evaluate the radiation characteristic variable. The evaluation unit is configured, in particular, to determine or to receive the quality parameter of the detected radiograph and, e.g., if the quality parameter satisfies a predetermined degradation criterion, to check whether the radiation characteristic variable lies in a predetermined range indicating a desired functioning of the radiation source. This is one example of an evaluation of the radiation characteristic variable. Moreover, the evaluation unit can be configured to ascertain a degradation of the detector device in the event of the degradation criterion being satisfied and in the event of a radiation dose in the predetermined dose range being present. Alternatively or additionally, on the basis of the radiation characteristic variable, it is possible to determine what quality losses have been experienced by the radiation source and/or the detector device. Generally, the evaluation unit can therefore be configured to make a statement about a state of the detector device and/or the radiation source on the basis of the quality parameter and the radiation characteristic variable.

The radiation source can be configured to emit electromagnetic radiation in the form of X-ray radiation. For this purpose, the radiation source can include an X-ray tube and/or a particle beam source, in particular for emitting electrons. The emitted electrons or other emitted particles can impinge on a target configured to generate the invasive radiation in the form of bremsstrahlung. The invasive radiation finally emitted by the radiation source can be radiated onto the detector device through an object receiving region (may also be referred to as measurement volume). The object receiving region can include a suitable structure for positioning, supporting and/or holding the object, for example a rotary table or a mount. The object to be radiographed can be an industrial product or product produced by a skilled worker and/or a workpiece which is intended to be checked with regard to its dimensional accuracy, quality and/or freedom from defects.

The detector device can include or be configured as a flat image detector mentioned in the introduction. In particular, it can include a scintillator and/or a matrix-type arrangement of sensor elements (e.g., photodiodes). The detector device can generally be configured to detect two-dimensional radiographs of the object.

In particular, the object radiography apparatus can be configured in the manner of an industrial CT apparatus and detect a plurality of in particular two-dimensional radiographs from different irradiation directions. The radiographs can then be reconstructed to form three-dimensional views of the radiographed object.

The sensor arrangement can determine, e.g., a current radiation dose (radiation dose captured by the sensor arrangement within a current measurement period) and/or a cumulated (over a period since start-up of the object radiography apparatus or resetting of a dosimeter) radiation dose. The cumulated radiation dose can indicate the measured radiation dose added up over a previous lifetime or a defined operating duration of the detector device. By contrast, the current radiation dose can concern the radiation dose emitted for a current image detection and/or impinging on the detector device for a current image detection. In the case of X-ray radiation, the radiation dose can be measured in the form of an energy dose (for example in the unit gray) or in the form of an ion dose.

In principle, the radiation dose measured by the sensor arrangement can be measured at an arbitrary location in the beam path of the radiation generated by the radiation source and/or relate to an arbitrary radiation dose along the path. In one exemplary embodiment, the measured radiation dose is converted into a radiation dose impinging on the detector device. The impinging radiation dose provides information about what radiation dose is actually available to the detector device for image detection. Additionally or alternatively, the radiation dose measured by the sensor arrangement can be converted into a radiation dose emitted directly by the radiation source (source dose hereinafter). The source dose can provide information about the performance of the radiation source and/or about whether the latter reaches a predetermined setpoint value. The relationships required for the conversion can be experimentally determined and/or calculated.

As an approximation, the emitted radiation dose measured by the sensor arrangement can also be assumed to be identical to the impinging radiation dose and/or to the source dose. In particular, as an approximation, the impinging radiation dose can be assumed to be identical to the source dose. Instead of a respective identity, a predetermined constant ratio of the above values can also be assumed. Furthermore, all of the above radiation dose values can in turn be regarded as current and/or as cumulated values.

A predetermined value range of the radiation characteristic variable (e.g., a dose range) that indicates a desired and, in particular, fault-free functioning of the radiation source can be determined beforehand (for example experimentally or by calculations).

As mentioned, as an alternative or in addition to the dose, some other radiation characteristic variable, such as, e.g., a radiation flux density, can be detected in the spatial detection region of the sensor arrangement. Conversions to the corresponding variable at the radiation source and/or at the detector can be carried out in a manner analogous to that in the case of the dose.

The evaluation unit can be part of or form a computer or control device of the object radiography apparatus. In particular, the evaluation unit can include a processor (or a CPU) and/or be connected to the sensor arrangement for communicating data or signals. The evaluation unit can determine a predetermined quality parameter of the radiograph for example with the aid of image evaluation algorithms. The quality parameter is typically a signal-to-noise ratio of the image signals generated by the detector device. Alternatively or additionally, it is possible to determine a spectral error, a contrast error, a degree of unsharpness, an exposure error or some other suitable parameter that allows a conclusion to be drawn about the quality and/or the error freedom (or an error) of the image detection. In any case, when determining the quality parameter of the radiograph, it is optionally possible to use additional information such as, e.g., information about image values of at least one dark image of the detector device. When capturing a dark image, the detector device is not irradiated by the radiation source.

Noise is understood to mean a deviation of measurement values that is based on random processes (e.g., on account of thermal, electrical or photonic disturbance influences). The signal-to-noise ratio is, in particular, the quotient of a mean value of the signal intensity and a standard deviation in the case of this signal intensity. The standard deviation can be formed from the change in the signal (e.g., a pixel) over time or from the spatial deviation and/or variation of the signal (e.g., from a defined number of pixels which belong to the same mean value of the signal intensity).

A degradation criterion with regard to which the quality parameter can be rated, can include the reaching of a predetermined threshold value (or under- or overshooting thereof). However, it is possible alternatively or additionally repeatedly to ascertain what the quality of the radiograph is and, in particular, what value the quality parameter has. If the quality of the detector device decreases (e.g., owing to decreasing effectiveness of a scintillation layer) and/or the quality of the radiation source (as a result of decreasing radiation power), a decreasing quality can accordingly be ascertained. The quality corresponds to a state of the object radiography apparatus. Optionally, on the basis of the quality, it is possible to predict when (e.g., after how many further radiography processes and/or after what further operating time, optionally taking account of the radiation power that is incident on the detector) maintenance, exchange or repair will become necessary. Since the sensor arrangement additionally determines the radiation characteristic variable, the evaluation unit can also determine with what proportion the radiation source and the detector device contribute to the loss of quality. It is therefore also possible to predict whether and when maintenance, exchange or repair in each case of the radiation source and the detector device will become necessary. Details in this respect will be discussed even more specifically.

Upon a degradation being ascertained, upon a loss of quality being ascertained and/or upon a predefined state of the radiation source and/or of the detector device being reached, an alarm signal and/or a warning message can furthermore be output (e.g., by the evaluation unit). The warning message and/or the alarm signal can be displayed to a user by way of a display apparatus of the object radiography apparatus and/or be communicated to other units or components of the apparatus.

The object radiography apparatus disclosed herein can make it possible overall to reliably determine a state of the detector device and/or of the radiation source. In particular, provision is made for determining a radiation dose of the radiation source as radiation characteristic variable. It is only if the radiation dose lies in a predetermined dose range that allows a desired and, in particular, fault-free functioning of the radiation source to be deduced that the conclusion is drawn that possible quality deficiencies in the detected radiograph are attributable to quality deficiencies in the detector device. The same correspondingly applies to other radiation characteristic variables. In other words, it is ensured that deficiencies in the detected radiograph are not caused solely by deficiencies of the radiation source, rather that actually the detector device is the cause or is concomitantly the cause of the deficiencies. An unnecessary and above all excessively early exchange of the comparatively expensive detector device can thus be prevented. Likewise, it is possible to ascertain with greater certainty which unit is actually responsible for a decreasing image quality.

In principle, provision can also be made for ascertaining a degradation and/or a reduced quality of the radiation source in the case where a radiation characteristic variable outside a predetermined value range is determined. This, too, can be ascertained by the evaluation unit and indicated for example in the form of a warning or alarm signal. In addition, provision can be made of a condition according to which a corresponding reduced quality of the radiation source is ascertained only if the determined radiation characteristic variable lies outside the predetermined value range and as well the determined quality parameter satisfies a predetermined criterion that means a reduced quality of the image generation by the detector device. In other words, the reduced quality of the radiation source can be checked and ascertained redundantly by the radiation characteristic variable and the quality parameter.

Furthermore, provision can be made for recording the information in the form of the radiation characteristic variable and/or the quality parameter repeatedly over a longer operating duration and/or a greater number of image detections. Thereby, it is possible to determine emerging developments with regard to a decreasing quality of the detector device and/or of the radiation source. By way of example, a progressive decrease in the quality parameter with a substantially constant radiation characteristic variable indicates increasing ageing of the detector device. In the context of the method and apparatus disclosed in the present case, a user can be informed of such a development, e.g., by suitable warning messages.

Developments of the method and of the apparatus are explained below. Particularly in the case of developments concerning the structure of the object radiography apparatus, however, it is not mandatory to provide an evaluation unit of the above type and/or a check carried out by the latter.

According to an aspect of the invention, the method and the apparatus provide for the sensor arrangement to include at least one ionization chamber in order to determine a radiation flux density and/or a radiation dose as the radiation characteristic variable. Using an ionization chamber makes it possible to ensure reliable monitoring of the radiation characteristic variable over a long operating duration (for example over a number of weeks or months). The ionization chamber can be based on the principle of a plate capacitor using air as a dielectric, whereby it is possible to minimize undesired damage to the sensor arrangement as a result of invasive radiation, in particular X-ray radiation. Furthermore, the ionization chamber is distinguished by comparatively low production costs and offers comprehensive degrees of freedom with regard to its positioning and/or extent within the object radiography apparatus.

Although not typical, it is possible, instead of using a sensor arrangement for determining the radiation characteristic variable, permanently or temporarily for at least one known object to be introduced into the beam path between radiation source and detector device. In particular, the effect on the radiation passing through the respective object may be known (e.g., have been determined beforehand). The radiation altered by interaction with the object can be detected by the detector device and, through comparison with the known effects, it is possible to ascertain whether and to what extent the detector device has qualitative deficiencies or what state it is in. However, this method is less accurate compared with a measurement of the radiation characteristic variable. If the object is introduced into the beam path only temporarily, the method is also more complex.

The ionization chamber can furthermore provide a return signal which corresponds to the radiation flux density and is able to be converted, e.g., into a measured radiation dose, for instance by integration with respect to time. If the ionization chamber includes a capacitor, then the capacitor can be regulated, e.g., to a constant electrical voltage and the electrical current required for this purpose can be used as return signal. In one exemplary embodiment, the electrical current can be measured as a voltage drop across an electrical load. Alternatively, the discharge of the capacitor, i.e., the time derivative of the electrical voltage, integrated over a time interval of predefined length, can be determined as return signal.

The return signal can be evaluated by software, wherein summation can be carried out for example by a counter for obtaining a dose value. The summation can be carried out in or after predefined time intervals. The software can additionally supplement the summed count or dose value with time information and/or information concerning a specific image detection process. By way of example, the value can be stored as a data value provided with a time stamp, and/or as a data value assigned to a specific image detection process.

As an alternative or in addition to determining a dose value, the evaluation unit can be configured to detect further operating parameters of the object radiography apparatus and to store them typically with assignment of a respective time stamp and/or a specific image detection process (for example as an individual data set within a database). This can also be provided as a corresponding method step in the context of the method disclosed in the present case. The operating parameters can include present parameters of the radiation source such as electron beam density, the quality parameter of the detected radiograph or other detector parameters. It is thus possible to gather information in order for example to understand from what point in time and under what conditions losses of quality occur or have occurred on the part of the detector device.

Generally, the sensor arrangement can also include a plurality of individual sensor units in order to achieve a certain spatial resolution of the detected radiation dose. In this case, each sensor unit can determine a dedicated and typically location-related value of the radiation characteristic variable. In particular, separate measurements can be performed in a plurality of predetermined regions or at a plurality of predetermined positions, such that a spatial assignment of the radiation characteristic variable respectively measured is possible and/or a spatial distribution of the radiation emitted overall (e.g., of the radiation flux density) is able to be determined. By using ionization chambers, for example, individual sensor units of this type, each of which can include at least one dedicated ionization chamber, can be provided with little complexity and in a cost-effective manner.

Furthermore, the radiation characteristic variable determined can be taken into account when feedback controlling (regulating) the radiation emitted by the radiation source. According to one aspect of the method and the apparatus, as a result of the regulation at least within certain limits, e.g., the radiation power of the radiation source can be kept constant despite decreasing quality of the radiation source.

In particular, the determined value of the radiation characteristic variable is compared with an expected setpoint value and the setpoint/actual deviation ascertained in this case is used for the regulation of the radiation source. By way of example, by this means it is possible to regulate a voltage source by which the radiation source generates a particle beam (in particular an electron beam) that is directed onto a target in order to generate bremsstrahlung or X-ray radiation emitted into the surroundings. In other words, the radiation characteristic variable can be used to carry out a regulation of the electromagnetic radiation finally emitted or, to put it another way, a spot regulation of precisely this radiation. Moreover, the state of the detector device can be determined, as described. According to one aspect of the method and apparatus, if the setpoint/actual deviation with regard to the radiation characteristic variable satisfies a predetermined criterion (for example the overshooting of a threshold value), it is deduced that the radiation source has reached a state of reduced quality and, e.g., a predetermined value of the radiation characteristic variable is no longer attained.

The use of the radiation characteristic variable as a variable for radiation source regulation can supplement or partly replace variables usually used for radiation source regulation. The customary variables can be a metrologically detected electron current formed by electrons flowing to a target. Additionally or alternatively, the variables can be a metrologically detected target current formed by the electrons that reach a possible target. Given a known voltage and a known target material, the measured radiation characteristic variable can also be converted into the target current. In particular, there may be a proportional relationship between the target current and the detected radiation characteristic variable.

The detection of the radiation characteristic variable for radiation source regulation can furthermore have the advantage of an increased error tolerance and be, in particular, insensitive to an erroneous target current signal on account of potential changes as a result of contact with conductive objects within the object radiography apparatus and electrical charges within the radiation source. Furthermore, electrical or thermal insulations within the radiation source, which as is known are used for detecting the customary regulated variables, can be omitted or used only to a reduced extent. Furthermore, disturbances such as incipient target wear (for example in the form of burn-off) can also be deduced more directly and more reliably from the detected radiation characteristic variable.

According to one aspect of the method and the apparatus, a portion of electromagnetic radiation that is not used for detecting the radiograph can be detected (e.g., by the sensor arrangement mentioned above) for the purpose of determining the radiation characteristic variable. This can involve for example a coupled-out radiation portion (for example coupled out from a radiography cone) and/or a radiation portion that does not interact with the detector device. According to one aspect of the invention, it involves a region of an expanded beam cone and, in particular, the outer marginal region thereof which does not interact with the detector device for image detection. Worded in a general way, the radiation portion detected by the sensor arrangement can pass spatially at a distance from and/or in an interaction-free manner relative to the detector device.

According to an aspect of the method and the apparatus, the sensor arrangement is arranged in such a way that it detects a radiation portion of the radiation generated by the radiation source which lies or passes outside a solid angle containing the detector device. The solid angle containing the detector device extends in a manner proceeding from the radiation source and for example proceeding from an output window or a radiation emission region of the radiation source from the latter to the detector device. The solid angle can contain or define a radiography cone (or referred to also as used beam cone) of the emitted radiation, wherein the radiography cone is used for generating the radiograph. In other words, the sensor arrangement can thus be configured to detect a radiation portion outside the used beam cone.

Generally, in association with the present application, instead of a beam cone, a deformed, non-rotationally symmetrical beam cone or a differently shaped radiography region can be involved, within which the invasive radiation proceeding from the radiation source propagates to the detector.

According to an aspect, the apparatus includes a separating arrangement in order to separate (or, in other words, to couple out) from the radiation generated by the radiation source the radiation portion detected by the sensor arrangement. The separating arrangement can include an aperture or a collimator, as explained below. In particular, such separation or splitting of the emitted radiation can be carried out in a manner thereby enabling the above-explained detection of the radiation dose outside a solid angle containing the detector device. According to an aspect of method and apparatus, the emitted radiation is split into a radiography cone for object radiography and into a radiation portion separate therefrom for dose detection.

Consequently, reliable splitting of the radiation into a portion for determining the radiation characteristic variable and a portion for image detection can be carried out by the separating arrangement. On account of this defined splitting, the radiation characteristic variable and the radiograph can be detected reliably and precisely.

As mentioned, the separating arrangement can include or be formed by a collimator and/or an aperture, in particular. In the case of an aperture, with the exception of openings for radiation to pass through, the separating arrangement can be non-transmissive to the electromagnetic radiation and thus allow radiation impinging on the aperture only to pass through the openings. Typically, the separating arrangement includes at least a first and a second opening for splitting the radiation into individual radiation portions. The openings can separate from one another or define the above-explained portions for determining the radiation characteristic variable and for image detection. The use of an aperture having openings can enable the desired radiation portions to be reliably defined in conjunction with a comparatively simple construction.

In accordance with an exemplary embodiment of the apparatus and of the method, the sensor arrangement and the detector device extend at least in sections in a common plane or in planes parallel to one another or substantially parallel to one another. The plane containing the sensor arrangement can be a radiation incidence plane of the sensor arrangement, e.g., of an ionization chamber. The plane containing the detector device can be a detection plane of the detector device, e.g., in the form of the detector area of a possible flat image detector.

According to an aspect of the invention, the sensor arrangement is arranged parallel to the detector device but further away than the detector device from the viewpoint of the radiation source. In this case, what is also conceivable is an arrangement along a common spatial axis and/or a typically contact-free but at least partly overlapping arrangement of detector device and sensor arrangement (for example overlapping from the viewpoint of the radiation source).

In a further exemplary embodiment, the sensor arrangement is arranged in the same plane as the detector device or, from the viewpoint of the radiation source, parallel to the detector device but at a lesser distance than the detector device. In this case, an overlapping arrangement of detector device and sensor arrangement is typically not provided, with the result that the sensor arrangement does not impede image detection by the detector device. In other words, the sensor arrangement is typically positioned in such a way that it does not block or prevent a radiation portion provided for object radiography and/or image detection from reaching the detector device. This can be achieved by the possibilities explained herein for arranging the sensor arrangement outside a solid angle containing the detector device.

Additionally or alternatively, the sensor arrangement can extend at least in sections along the detector device and/or enclose the latter in a frame-like fashion. In both cases, provision can be made for the sensor arrangement and the detector device to extend in a common plane. Extension in planes that are parallel and typically only slightly spaced apart can likewise be provided, wherein the sensor arrangement can be arranged for example in a plane positioned in-front or behind of the detector device from the viewpoint of the radiation source.

Arrangement along the detector device or enclosure thereof in a frame-like fashion makes it possible to position the sensor arrangement close to the detector device and thus to detect a radiation which substantially corresponds to the radiation used for image detection. The meaningfulness of the radiation dose determined by the sensor arrangement can be increased as a result.

In this context (i.e., in the case of extension along the detector device or enclosure in a frame-like fashion), the sensor arrangement can furthermore be dimensioned in such a way that it can compensate for centration errors between a radiation incidence surface and the detector device (in particular centration errors in the plane of the detector device). By way of example, the radiation in the form of a radiography cone can be expanded in particular by a predetermined amount, such that for the detection of the radiation characteristic variable by the sensor arrangement, the radiation does not only impinge on the area of the detector device. As a result of the expansion, an outer radiation portion in addition to the actual radiography cone (e.g., in a lateral surface of the radiography cone) is provided for measuring the radiation characteristic variable. In particular, the expansion can be carried out in such a way that the detector device and a sensor arrangement situated along there or enclosing the latter are able to be irradiated simultaneously. A centration error could have the effect, in principle, that the radiography cone is displaced relative and in particular parallel to the detector device and also the sensor arrangement and no longer covers at least the latter in the expected way. Despite the same radiation dose on the detector, the radiation characteristic variable measured by the sensor arrangement can decrease on account of this altered coverage.

In accordance with the aspects of to the invention, therefore, a width and/or a marginal region of the sensor arrangement are/is dimensioned in such a way that in the case of an optimum centration of emitted radiation and detector device, the sensor arrangement encompasses regions which are not completely covered by the radiation incidence surface. The regions can provide reserves in order to compensate for possible centration errors. By way of example, the regions may be irradiated only upon a relative displacement of radiography cone and detector device vis-à-vis the optimum centration and thus enable a detection of the radiation characteristic variable despite centration errors. In this case, the relative displacement may take place in particular in the plane of the detector device.

According to an aspect of the invention, the sensor arrangement includes corresponding (reserve) regions at at least two sides of the detector device, and in particular a frame-like marginal region dimensioned with appropriate width. In this case, the detected radiation characteristic variable can remain substantially constant despite centration errors. By way of example, it may therefore be unimportant that a first region of the sensor arrangement, which first region would be irradiated in the case of an optimum centration, is no longer irradiated owing to the centration error if a reserve region explained above is irradiated instead (e.g., at an opposite side and, in particular, an opposite marginal region of a possible frame structure). Since the sensor area irradiated overall thus remains substantially constant despite centration errors, the measured radiation characteristic variable can also remain constant.

Alternatively or additionally, at least one part of the sensor arrangement can be situated laterally with respect to a radiography region of the object radiography apparatus, in which objects are positionable for radiography and within which the invasive radiation emanating from the radiation source propagates to the detector. Particularly, if the separating arrangement for separating the radiation generated by the radiation source is present, the part of the sensor arrangement or the sensor arrangement can be arranged significantly closer to the radiation source than the detector device. A compact object radiography apparatus can therefore be realized. The space required for the object radiography apparatus can be reduced in the region of the detector device.

To summarize, by the above exemplary embodiments it is possible to prevent a centration error between the emitted radiation and the detector device from inevitably being manifested in a measurement error of the radiation characteristic variable.

The invention furthermore relates to a method for determining a state of a detector device, including the following steps:

emitting electromagnetic radiation by a radiation source of the object radiography apparatus, such that the radiation is directed onto an object to be radiographed and radiation passing through the object is incident at least proportionally on a detector device of the object radiography apparatus, detecting a radiograph of the object by the detector device, determining a radiation characteristic variable assigned to the radiation source, determining a quality parameter of the detected radiograph, evaluating the radiation characteristic variable taking account of the quality parameter, and determining a state of the detector device and/or of the radiation source from a result of the evaluation.

Unless otherwise indicated or evident, the above listing should not be understood as a mandatory temporal order. The method can furthermore include any further step and any further feature in order to provide all of the interactions, operating states or effects explained above or below.

In particular, the method can include a step of feedback controlling (regulating) the radiation emitted by the radiation source on the basis of the radiation characteristic variable determined. A step of separating a radiation portion for detecting the radiation characteristic variable can likewise be provided.

BRIEF DESCRIPTION OF THE DRAWINGS

The invention will now be described with reference to the drawings wherein.

DESCRIPTION OF EXEMPLARY EMBODIMENTS

Figure 1:
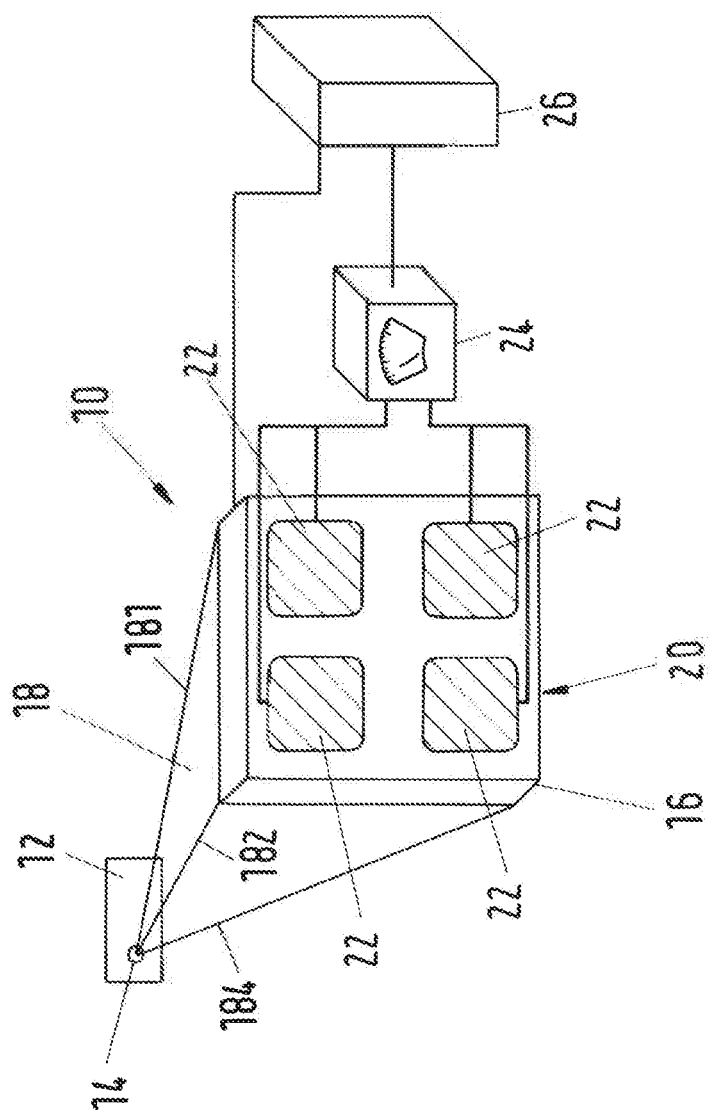
FIG. 1 illustrates an object radiography apparatus in accordance with a first exemplary embodiment.

FIG. 1 shows an object radiography apparatus 10 in accordance with a first exemplary embodiment. The object radiography apparatus 10 includes an X-ray tube as radiation source 12. The latter is configured to emit electromagnetic radiation in the form of X-ray radiation from a radiation generating region 14 and to direct it onto a detector device 16. A rear side of the detector device 16 is discernible in the illustration shown. At its front side facing the radiation source 12, the detector device 16 has a detector area for detecting the incident radiation. The detector device 16 is configured as a flat image detector for X-ray radiation and includes components, e.g., a scintillator layer on a matrix of photodiodes.

As indicated in FIG. 1, the radiation emitted by the radiation source 12 expands within a radiography region 18, wherein boundary rays 181, 182 and 184 of the radiography region 18 are illustrated in FIG. 1. The radiography region 18 defines a solid angle at which the radiation propagates proceeding from the radiation source 12. The radiography region 18 extends between the radiation generating region 14 and the detector device 16, wherein the detector device contains at least the detector area. In FIG. 1 and also further figures, the arrangement of the boundary rays of the radiography region 18 can be interpreted such that a pyramidal radiography region 18 is intended to be represented thereby. Radiation emerging from the radiation source and passing through the radiography region 18 impinges on the, in particular rectangular, detector area of the detector device 16.

FIG. 1 does not separately illustrate that the radiography region 18 extends through an object receiving region. An object to be radiographed (e.g., an industrially manufactured workpiece) can be positioned in the object receiving region. If the X-ray radiation from the radiation source 12 is directed onto such an object, a two-dimensional radiograph of the object can be created and evaluated by the detector device 16 in a manner known per se. In this case, the object radiography apparatus 10 of the present exemplary embodiment, but also of the subsequent exemplary embodiments, is operable in the manner of a computed tomography apparatus in order to reconstruct a three-dimensional image of the object.

A sensor arrangement 20 is arranged at the rear side of the detector device 16 facing the observer in FIG. 1. The sensor arrangement includes four individual sensor units 22, which are positioned in a plane extending parallel to the detector device 16 and at least partly overlap the detector device 16 from the viewpoint of the radiation source 12. The sensor units 22 are in each case configured to determine a radiation characteristic variable (e.g., a radiation dose) of the X-ray radiation that is emitted by the radiation source 12 and at least partly passes through the detector device 16. By way of example, the sensor units 22 are each configured as ionization chambers.

By using a plurality of individual sensor units 22, which are furthermore assigned to different positions and regions of the detector device 16, it is possible, not just in this exemplary embodiment, for the radiation characteristic variable to be determined in a manner resolved into spatial regions (or regions of a detection plane of the sensor arrangement) or in a spatially resolved manner with respect to the detector device 16. In particular, the shown multipartite structure of the sensor arrangement 20 enables a spatial resolution in the detection of a radiation dose.

The sensor arrangement 20 furthermore includes an optional measuring unit 24, which is merely indicated schematically, in order to evaluate and/or condition the measurement signals detected by the sensor units 22 and to make them available to an evaluation unit 26 of the object radiography apparatus 10. In this context, FIG. 1 schematically indicates signal paths between the sensor units 22 and the measuring unit 24 and also between the measuring unit 24 and the evaluation unit 26. The signal respectively communicated by the sensor units 22 and/or the measuring unit 24 can be continuous, but is typically time-discrete.

By way of example, the measuring unit 24 can detect a voltage signal generated by the sensor units 22 in predetermined time intervals (e.g., in accordance with a measurement clock) and, e.g., correspondingly cumulate a dose count. From this it is possible to determine a dose value over a predetermined total time period, e.g., a dose value for an individual object radiography process (or an individual image detection) and/or for a total operating duration of the detector device 16. In the case of determining a current dose value for an individual image detection, the abovementioned time intervals for cumulating a dose count are correspondingly short. The dose value determined can be provided with a time stamp and compared with a quality parameter of a simultaneously determined radiograph in the manner below.

The evaluation unit 26 is furthermore connected to the detector device 16 via a signal path, which is likewise indicated schematically in FIG. 1. Image signals determined and/or radiographs completely detected by the detector device 16 are thus likewise communicated to the evaluation unit 26 in addition to the measured radiation dose. The evaluation unit 26 can include a processor and suitable software for further processing and/or conditioning the items of information respectively obtained, in the manner explained below.

In particular, the evaluation unit 26 determines from the detected radiograph a signal-to-noise ratio that forms a quality parameter of the radiograph. By forming a quotient of the signal portion and the noise portion, a scalar signal-to-noise ratio or a signal-to-noise map with respect to the pixel matrix is subsequently determined.

The signal-to-noise ratio determined by the evaluation unit is stored as a quality parameter of the detected radiograph and checked with regard to a quality criterion. In the case shown, the quality criterion defines a threshold value for the signal-to-noise ratio which ought not to be undershot. If this is the case, the noise portion in the detected image is too high and the detector device 16 is classified as potentially defective and/or in a state of reduced quality.

To summarize, items of information about a quality parameter of the detected radiograph and a radiation characteristic variable of the emitted radiation impinging on the sensor arrangement 20 are thus available to the evaluation unit 26 after an image detection. In this case, in the exemplary embodiment shown, the current value of the radiation characteristic variable per image detection is considered and taken as a basis for the further evaluation.

The evaluation unit 26 is furthermore configured to ascertain a state of the detector device 16 on the basis of these items of information. In particular, it is configured to check the quality parameter with regard to satisfying the quality criterion explained above. Satisfying the quality criterion means a possible reduced quality of the image generation by the detector device 16. If it is determined that this quality criterion is satisfied and the detector device 16 is potentially in a state of reduced quality, the radiation characteristic variable determined is additionally considered. In particular, a check is made to establish whether the value or values of the radiation characteristic variable lie(s) in a predetermined value range indicating a desired functioning of the radiation source. If this is the case, it can be deduced that the reduced quality of the detected radiograph (or the lower value of the quality parameter) is mainly attributable to a correspondingly reduced state of the detector device 16. The detector device 16 should therefore be serviced or exchanged, which can be conveyed to a user by a corresponding warning message.

By contrast, if the value or the values of the radiation characteristic variable does not lie in the predetermined value range (e.g., if the radiation dose lies below a predetermined minimum limit of the dose range), it can be deduced, by contrast, that the radiation source 12 is in a state of reduced quality and has emitted, e.g., an excessively low radiation dose or radiation having an excessively low radiation flux density. In this case, the radiation source 12 would have to be serviced or exchanged, but not necessarily the detector device 16. This can also be determined by the evaluation unit 26 and conveyed to a user by a corresponding warning message.

It goes without saying that the evaluation unit 26 can also ascertain that, given reduced quality of at least one radiograph, both the radiation source and the detector device are in a state of reduced quality, e.g., if the radiation power of the source is indeed excessively low, but this cannot lead by itself to the poor image quality. In particular, this can be found out by determining a relationship between the image quality and the radiation power of the source beforehand given good quality of the detector device and using this information later during operation of the apparatus.

In an overall view, the exemplary embodiment from FIG. 1 thus makes it possible to reliably ascertain the fault cause of quality deficiencies in a detected object radiograph. In particular, this makes it possible to reliably determine whether the detector device 16 is in a state of reduced quality and represents the cause of possible quality deficiencies. Alternatively or additionally, it can be ascertained whether the radiation source 12 is the cause owing to emitting an excessively low radiation.

The evaluation unit 26 can optionally also be configured to record the detected items of information and in particular the temporal profile thereof over a plurality of image detections and/or longer operating durations of the object radiography apparatus 10. These items of information can be evaluated in order to determine a possible decreasing quality of the detector device 16 and/or of the radiation source 12. This is the case, for example, if the quality parameter of the radiograph or of the radiographs progressively decreases with the value of the radiation characteristic variable remaining constant over a relatively long period of time. Such a development may indicate that, in the case of the detector device 16, ageing is progressing and maintenance or exchange will become necessary, if appropriate, in the near future. A user of the object radiography apparatus 10 can be informed of this by the evaluation unit 26 by corresponding warning messages or a forecast.

Figure 2A:
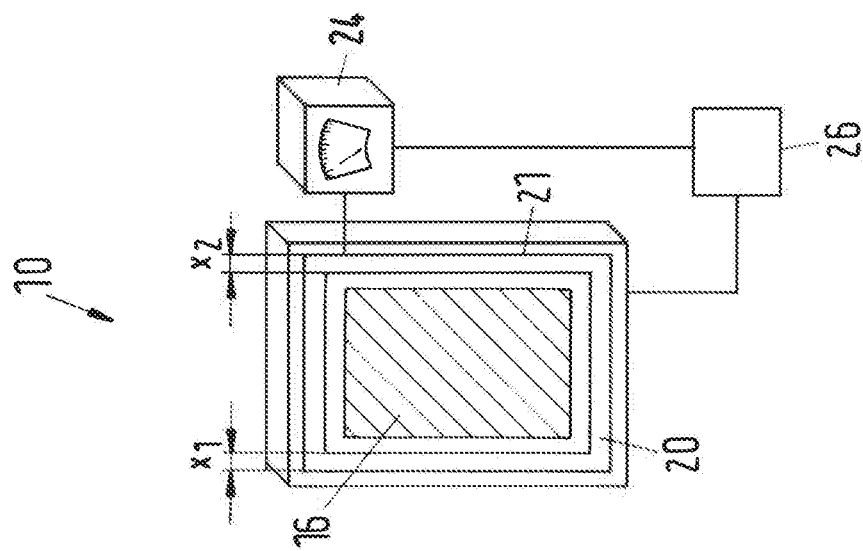
FIGS. 2A and 2B illustrate an object radiography apparatus in accordance with a second exemplary embodiment.
Figure 2B:
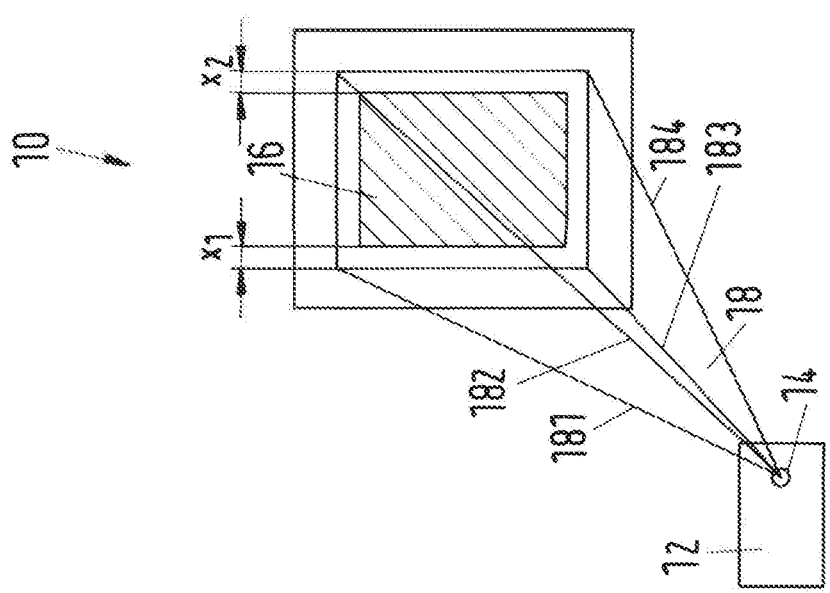

FIG. 2A and FIG. 2B show an object radiography apparatus 10 in accordance with a further embodiment. FIG. 2a once again reveals a radiation source 12, which emits a radiography region 18, wherein four boundary rays 181, 182, 183 and 184 thereof are illustrated. The illustration in FIG. 2A deviates from that from FIG. 1 in so far as the front side of a detector device 16 is now considered. It is evident that the emitted radiation, which is in turn present in the form of X-ray radiation, irradiates the detector device 16. To put it more precisely, the radiography region 18 covers the entire front area of the detector device 16 which is useable for detecting a radiograph. Once again an object to be radiographed in the object receiving region is not explicitly shown. Analogously to FIG. 1, however, the receiving region is once again located between the radiation source 12 and the detector device 16, such that the emitted X-rays pass through the receiving region.

FIG. 2A furthermore reveals that the radiography region 18 upon impinging in the region of the detector device 16 is expanded beyond the front area of the detector device 16. For reasons of simplified illustration of distances between edges of the detector area and edges of the radiography region, adjacent intersection points of the four boundary rays 181, 182, 183 and 184 with the plane of the detector device 16 are connected to one another by straight lines. This corresponds to a pyramid shape of the radiography region 18. The expansion can be carried out by a suitable collimator device, e.g., near the radiation generating region 14 of the radiation source 12. The extent of the expansion is indicated by corresponding distance dimensions x1 and x2. Given optimum centration of radiography region 18 and detector device 16 (i.e., in the case of a concentric arrangement thereof), provision is made for the distance dimension to be constant along the entire detector device 16. In this case, the detector device 16 is positioned centrally within the radiography region 18.

A corresponding expansion of the radiography region 18 laterally beyond the front side of the detector device 16 generally cannot be avoided anyway for tolerance reasons, but in the present exemplary embodiment is set intentionally in order to detect the radiation characteristic variable by a frame-like sensor arrangement 20 extending around the detector device 16 from the viewpoint of the radiation source 12.

This is made clear from the illustration in FIG. 2B, which contains a detail view of the components irradiated in accordance with FIG. 2A. To put it more precisely, the detector device 16 is shown, which is enclosed or, to put it another way, surrounded or framed by a frame-like sensor arrangement 20 from the viewpoint of the radiation source. The width of the frame regions or of the edge regions 21 outside the detector area which are to be assigned to the sensor arrangement 20 is once again chosen appropriately for the expansion of the radiography region 18 in accordance with FIG. 2A (see corresponding dimensions x1 and x2). The sensor arrangement 20 is thus positioned outside a solid angle (cf. FIG. 1) containing only the detector device 16, but can reliably detect radiation in an outer part of the radiography region 18 for the purpose of determining the radiation characteristic variable.

The sensor arrangement 20 is again connected to a measuring unit 24. Both the detector device 16 and the measuring unit 24 are furthermore connected to an evaluation unit 26. The evaluation unit 26, once again analogously to the procedure from FIG. 1, can determine a quality parameter of the detected radiograph, ascertain a reduced quality of the radiograph and evaluate the radiation characteristic variable determined. Once again it is possible to ascertain therefrom a state of reduced quality of the detector device 16 and/or of the radiation source, e.g., in a manner identical to the procedure explained with reference to FIG. 1.

An exemplary embodiment for compensating for possible centration errors in the plane of the detector device 16 is explained below with reference to FIGS. 3A, 3B. This exemplary embodiment is based on the frame-like sensor arrangement 20 in accordance with FIG. 2B and is configured identically to the previous exemplary embodiment with the exception of deviations referred to below.

Figure 3B:
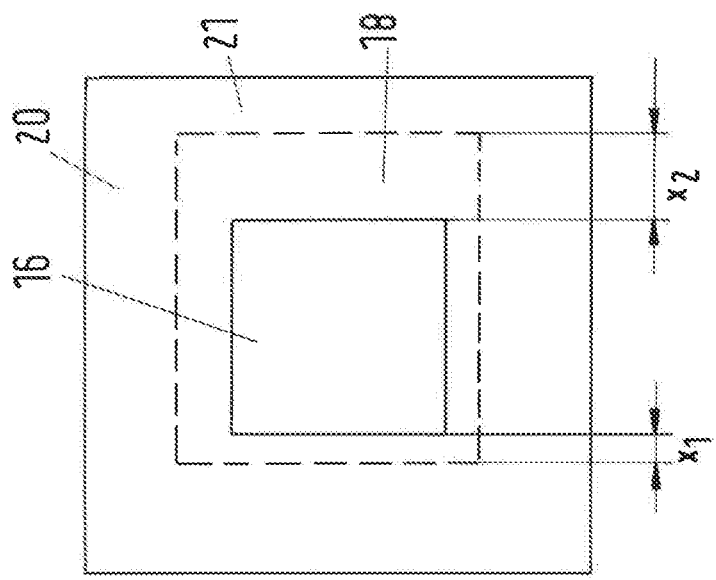
FIGS. 3A and 3B illustrate views for elucidating a centration error compensation by an object radiography apparatus in accordance with a third exemplary embodiment.
Figure 3A:
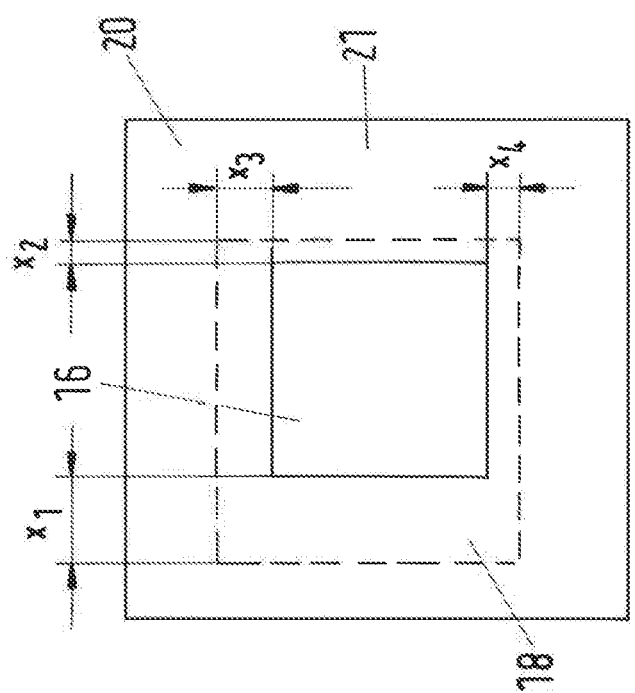

In the case of an inaccurate centration of the impingement region—indicated by dashed lines in FIGS. 3A, 3B—of the radiography region 18 on the plane of incidence of the detector device 16, the distance dimensions x1 and x2 can deviate from one another. In particular, marginal regions of different widths of the impinging electromagnetic radiation around the detector device 16 can result. The impingement region of the radiography region 18 is then not centred with respect to the detector device 16 (displaced toward the left in FIG. 3A and toward the right in FIG. 3B). However, the sum of the corresponding distance dimensions x1 and x2 remains substantially constant since possible centration deficiencies result primarily in a displacement of the relevant impingement region parallel to the plane of the detector device 16. This becomes clear from an overall view of FIGS. 3A and 3B.

If the frame-like sensor arrangement 20 is then configured with a sufficient width, typically with a width that exceeds the corresponding distance dimensions x1 and x2 in the case of optimum centration by a factor of 2 or 3, it is possible to reliably detect the radiation dose even in the case of an inaccurate centration and in the case of distance dimensions x1 and x2 that deviate from one another. A correspondingly dimensioned sensor arrangement 20 is shown in each case in FIGS. 3A and 3B. In this case, edge regions 21 are available as reserves, which are at least partly irradiated only on account of a centration error. The total irradiated area of the sensor arrangement 20 is thus constant. For the sake of completeness, it is noted that typically the same correspondingly holds true also for the sum of the upper and lower distance dimensions x3 and x4 referenced only in FIG. 3A and the width of the sensor arrangement 20 in this direction.

In detail, in FIG. 3A, compared with the case of an optimum centration, more radiation is incident in a left edge region 21, whereas less radiation is incident in an opposite right edge region 21. The opposite is correspondingly applicable to FIG. 3B. However, the total irradiated area of the sensor arrangement 20 remains substantially constant.

This has the consequence that the total quantity of radiation detected by the sensor arrangement 20 likewise remains substantially constant and is therefore to the greatest possible extent independent of a possibly erroneous centration. By configuring the edges of the frame-like sensor arrangement 20 with a sufficient width, it is thus possible for the radiation characteristic variable to be reliably determined. There is a high tolerance vis-à-vis possible centration errors.

Figure 4:
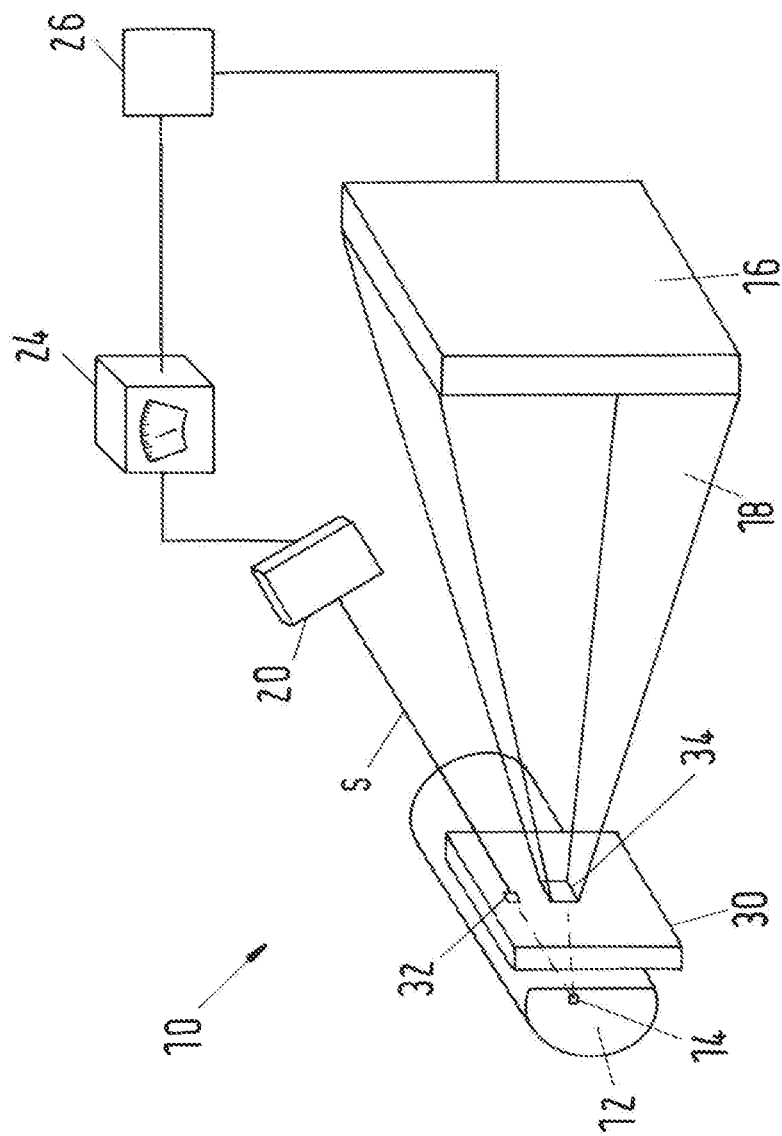
FIG. 4 illustrates an object radiography apparatus in accordance with a fourth exemplary embodiment.

FIG. 4 shows a fourth exemplary embodiment of an object radiography apparatus 10. In this case, the radiation emitted by an X-ray radiation source 12 is split into different portions for determining the radiation characteristic variable and for image detection. In detail, FIG. 4 reveals the radiation source 12, which is configured to emit electromagnetic radiation in the form of X-ray radiation. Both a detector device 16 for image detection and a sensor arrangement 20 for determining the radiation characteristic variable are arranged in relation to a separating arrangement 30 opposite with respect to a radiation generating region 14 of the radiation source 12. The detector device 16 can once again be configured as a flat image detector analogously to the previous examples. The sensor arrangement 20 includes, e.g., an ionization chamber, as is likewise the case in the previous exemplary embodiments. Furthermore, the sensor arrangement 20 is connected to a measuring unit 24, which is in turn coupled to an evaluation unit 26 for signal transmission. In this exemplary embodiment, the sensor arrangement is arranged laterally with respect to the radiography region 18 of the object radiography apparatus.

A separating arrangement 30, e.g., in the form of an aperture plate is positioned near the radiation generating region 14 of the radiation source 12. The separating arrangement includes a first, comparatively smaller opening 32 and a second, comparatively larger opening 34. Apart from in the region of its openings 32, 34, the aperture plate (e.g., composed of lead) is substantially non-transmissive to the impinging X-ray radiation. To put it another way, X-ray radiation is enabled to pass through in an unimpeded manner only in the region of the openings 32, 34, such that the radiation generated by the radiation source 12 is split into corresponding portions passing through the openings 32, 34.

In detail, a first radiation portion S is separated or coupled out from the radiation available in total by the first opening 32. The resulting radiation portion S is directed onto the sensor arrangement 20 and can be evaluated for determining the radiation characteristic variable analogously to the exemplary embodiments above. Generally, the sensor arrangement 20 should be positioned as near as possible to the radiation source 12 in order to ensure a compact construction. Furthermore, e.g., by relationships determined beforehand, the radiation characteristic variable determined by the sensor arrangement 20 can be converted into a radiation characteristic variable of the radiation impinging on the detector device 16 (e.g., into a radiation dose). By contrast, the radiation portion passing through the second opening 34 defines a radiography region 18, which is directed onto the detector device 16 and is used for image detection.

Defining different radiation portions makes it possible for the image detection not to be impaired by a simultaneous determination of the radiation characteristic variable. Furthermore, the radiation portions can be optimised with regard to a positioning and/or the properties of the sensor arrangement 20 and of the detector device 16, such that all detection processes proceed as precisely as possible. The evaluation of the radiation characteristic variable determined and of the radiograph detected is once again carried out by the evaluation unit 26 and, e.g., in a manner identical to the embodiments above.

One advantage of the arrangement shown in FIG. 1 is a compact design and the fact that the individual sensor units 22 enable a spatially resolving detection of the X-ray radiation dose taking into account the additional attenuation by an object under test. The exemplary embodiment in accordance with FIG. 2A and FIG. 2B makes it possible to determine the radiation characteristic variable independently of a state of the detector device 16. To put it more precisely, the radiation detected by the sensor arrangement 20 does not first have to pass through the detector device 16, as is the case for the solution in accordance with FIG. 1. Consequently, determining the radiation characteristic variable is carried out independently of an object positioning upstream of the detector device 16.

In the exemplary embodiment in accordance with FIG. 4, too, a radiation portion for determining the radiation characteristic variable is detected, which radiation portion does not interact with the detector device 16 and thus cannot be corrupted by the latter. Furthermore, it is possible in this case for the image detection and determination of the radiation characteristic variable to be reliably spatially separated from one another and for adverse effects or interactions between these processes to be avoided. Finally, the exemplary embodiment in FIGS. 3A, 3B provides a high error tolerance vis-à-vis possible centration errors.

What all the exemplary embodiments have in common, finally, is that the corresponding sensor arrangements 20 together with measuring and/or evaluation units 24, 26 can also be retrofitted with little outlay. Furthermore, the determined values of the radiation characteristic variable can also be used for regulating the radiation source 12, as explained thoroughly in the general part of the description of this disclosure.

It is understood that the foregoing description is that of the exemplary embodiments of the invention and that various changes and modifications may be made thereto without departing from the spirit and scope of the invention as defined in the appended claims.

What is claimed is:

1. An object radiography apparatus, comprising:
   a radiation source configured to generate and emit an electromagnetic radiation for radiographing an object;
   a detector device configured to generate a radiograph of the object and arranged to permit the emitted electromagnetic radiation, which passes at least partly through the object, to imping at least proportionally on the detector device;
   a sensor arrangement provided in addition to the detector device configured to determine a radiation characteristic variable assigned to the radiation source, and
   an evaluation unit configured to:
   determine or receive a quality parameter of the radiograph of the object detected by the detector device, the quality parameter relating to at least one of an image quality of the radiograph and image signals generated by the detector device,
   evaluate the radiation characteristic variable, and
   make a statement about a state of the detector device based on the quality parameter relating to the radiograph generated by the detector device and based on the radiation characteristic variable determined by the sensor arrangement.

2. The object radiography apparatus according to claim 1, wherein the sensor arrangement comprises at least one ionization chamber configured to determine at least one of a radiation flux density and a radiation dose as the radiation characteristic variable.

3. The object radiography apparatus according to claim 1, wherein the radiation characteristic variable determined is taken into account when the radiation emitted by the radiation source is feedback controlled.

4. The object radiography apparatus according to claim 2, wherein the radiation characteristic variable determined is taken into account when the radiation emitted by the radiation source is feedback controlled.

5. The object radiography apparatus according to claim 1, wherein the sensor arrangement is arranged to permit detecting a radiation portion of the radiation generated by the radiation source which lies outside a solid angle containing the detector device.

6. The object radiography apparatus according to claim 5, further comprising:
   a separating arrangement configured to separate, from the radiation generated by the radiation source, the radiation portion detected by the sensor arrangement.

7. The object radiography apparatus according to claim 6, wherein the separating arrangement comprises an aperture, the aperture having at least a first opening and a second opening configured to split radiation that impinges on the aperture into individual radiation portions including the radiation portion detected by the sensor arrangement.

8. The object radiography apparatus according to claim 1, wherein the sensor arrangement and the detector device extend at least in sections in at least one of a common plane or in planes parallel to one another.

9. The object radiography apparatus according to claim 1, wherein the sensor arrangement extends at least in sections along the detector device.

10. The object radiography apparatus according to claim 1, wherein the sensor arrangement encloses the detector device in a frame-like fashion.

11. The object radiography apparatus according to claim 1, wherein at least one part of the sensor arrangement is located laterally with respect to a radiography region of the object radiography apparatus, and wherein in the radiography region, objects are positionable for radiography and the invasive radiation emanating from the radiation source propagates to the detector.

12. The object radiography apparatus according to claim 1, wherein the quality parameter is generated with an image evaluation algorithm.

13. The object radiography apparatus according to claim 1, wherein the quality parameter is at least one of a signal-to-noise ratio of the image signals generated by the detector device, a spectral error, a contrast error, and a degree of unsharpness.

14. The object radiography apparatus according to claim 1, wherein the evaluation unit is further configured to:
   as a statement, determine a degradation of the detector device when the quality parameter satisfies a degradation criterion and the radiation characteristic variable lying in a predetermined range, thereby indicating a desired functioning of the radiation source.

15. A method for determining a state of an object radiography apparatus, the method comprising:
   emitting electromagnetic radiation by a radiation source of the object radiography apparatus to permit the radiation to be directed onto an object to be radiographed and radiation passing through the object to incident at least proportionally on a detector device of the object radiography apparatus;
   detecting a radiograph of the object by the detector device;
   determining a radiation characteristic variable assigned to the radiation source;
   determining a quality parameter of the radiograph of the object detected by the detector device, the quality parameter relating to at least one of an image quality of the radiograph and image signals generated by the detector device;
   evaluating the radiation characteristic variable taking account of the quality parameter relating to the radiograph generated by the detector device; and
   determining a state of the detector device from a result of the evaluation.

* * * * *